US010948017B2

(12) United States Patent
Kanzaki

(10) Patent No.: US 10,948,017 B2
(45) Date of Patent: Mar. 16, 2021

(54) SEALING DEVICE

(71) Applicant: NOK CORPORATION, Tokyo (JP)

(72) Inventor: Go Kanzaki, Fukushima (JP)

(73) Assignee: NOK CORPORATION, Tokyo (JP)

( * ) Notice: Subject to any disclaimer, the term of this patent is extended or adjusted under 35 U.S.C. 154(b) by 89 days.

(21) Appl. No.: 16/468,128

(22) PCT Filed: Dec. 19, 2017

(86) PCT No.: PCT/JP2017/045539
§ 371 (c)(1),
(2) Date: Jun. 10, 2019

(87) PCT Pub. No.: WO2018/117102
PCT Pub. Date: Jun. 28, 2018

(65) Prior Publication Data
US 2020/0072284 A1 Mar. 5, 2020

(30) Foreign Application Priority Data
Dec. 21, 2016 (JP) .............................. JP2016-247464

(51) Int. Cl.
*F16C 33/78* (2006.01)
*F16J 15/3264* (2016.01)
(Continued)

(52) U.S. Cl.
CPC ...... *F16C 33/7883* (2013.01); *F16C 33/7823* (2013.01); *F16C 33/7889* (2013.01);
(Continued)

(58) Field of Classification Search
CPC .............. F16C 33/7879; F16C 33/7886; F16C 33/7883; F16C 33/7889; F16C 33/805; F16J 15/3256; F16J 15/3264
See application file for complete search history.

(56) References Cited

U.S. PATENT DOCUMENTS

| 4,755,067 A | 7/1988 | Asberg et al. |
| 4,948,277 A * | 8/1990 | Alff .......................... G01P 3/443 |
| | | 384/448 |

(Continued)

FOREIGN PATENT DOCUMENTS

| EP | 2821662 A1 | 1/2015 |
| FR | 3018874 A1 | 9/2015 |

(Continued)

OTHER PUBLICATIONS

Extended European Search Report for European Patent Application No. 17883479.2 dated Jul. 16, 2020.

(Continued)

*Primary Examiner* — Nicholas L Foster
(74) *Attorney, Agent, or Firm* — Pearne & Gordon LLP

(57) ABSTRACT

[Problem]
To provide a sealing device that has a high function of stopping the entry of foreign matter.
[Solution]
Provided is a sealing device disposed between a rotating inner member and a fixed outer member of a rolling bearing, said sealing device comprising: an annular rotating seal member fixed to the inner member; and an annular seal cover fixed to an end portion of the outer member. The seal cover comprises: a fixed portion that is disposed in an interval between the outer member and the inner member and fixed to the end portion of the outer member; and a protective portion that is disposed radially outward of the rotating seal member and stops foreign matter from advancing to the rotating seal member from the outside. The rotating seal member comprises: an attachment portion fixed to the inner member; and a seal lip and a dust lip that extend from the attachment portion toward the seal cover. The dust (Continued)

lip extends obliquely radially outward from the attachment portion toward the seal cover.

5 Claims, 6 Drawing Sheets

(51) Int. Cl.
    *F16J 15/3256*     (2016.01)
    *F16J 15/3204*     (2016.01)

(52) U.S. Cl.
    CPC ........... *F16J 15/3264* (2013.01); *F16C 33/78* (2013.01); *F16C 33/7879* (2013.01); *F16C 33/7886* (2013.01); *F16J 15/3204* (2013.01); *F16J 15/3256* (2013.01)

(56) References Cited

U.S. PATENT DOCUMENTS

| | | | | |
|---|---|---|---|---|
| 5,149,207 | A * | 9/1992 | Vignoito | F16C 19/184 277/377 |
| 5,618,116 | A * | 4/1997 | Lshikawa | F16C 19/10 277/361 |
| 5,944,321 | A * | 8/1999 | Niebling | F16C 33/7879 277/549 |
| 6,450,503 | B1 * | 9/2002 | Dossena | F16J 15/3256 277/549 |
| 6,471,211 | B1 * | 10/2002 | Garnett | F16C 19/34 277/351 |
| 8,474,825 | B2 * | 7/2013 | Nakagawa | F16J 15/164 277/353 |
| 10,240,677 | B2 * | 3/2019 | Angiulli | F16J 15/3268 |
| 10,385,922 | B2 * | 8/2019 | Inoue | F16C 19/18 |
| 2002/0051593 | A1 | 5/2002 | Oka | |
| 2011/0221140 | A1 * | 9/2011 | Nakagawa | F16J 15/3264 277/412 |
| 2012/0007316 | A1 | 1/2012 | Terasawa et al. | |
| 2016/0298769 | A1 * | 10/2016 | Angiulli | F16C 33/7823 |
| 2019/0017551 | A1 * | 1/2019 | Inoue | F16C 33/7876 |
| 2019/0390775 | A1 * | 12/2019 | Clark | F16C 33/7883 |

FOREIGN PATENT DOCUMENTS

| | | | | |
|---|---|---|---|---|
| FR | 3026450 | A1 | 4/2016 | |
| FR | 3018874 | B1 * | 12/2016 | ............ F16C 33/768 |
| GB | 2207470 | A | 2/1989 | |
| JP | S62233519 | A | 10/1987 | |
| JP | S631922 | U | 1/1988 | |
| JP | H01112027 | A | 4/1989 | |
| JP | 09274051 | A * | 7/1999 | .......... F16C 33/7879 |
| JP | 3991200 | B2 | 10/2007 | |
| JP | 2011117529 | A | 6/2011 | |
| JP | 2013224718 | A | 10/2013 | |
| JP | 2014013063 | A | 1/2014 | |
| JP | 2016205524 | A | 12/2016 | |
| KR | 20130137931 | A | 12/2013 | |
| WO | 2010113842 | A1 | 10/2010 | |

OTHER PUBLICATIONS

Search Report and translation for International Application No. PCT/JP2017/045539 dated Jun. 28, 2018.

* cited by examiner

[Figure 1]
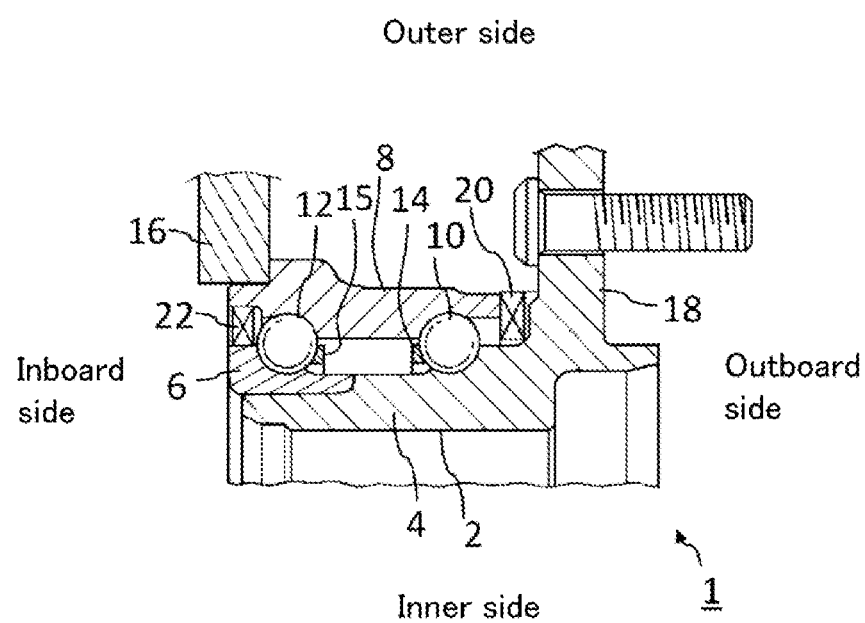

[Figure 2]
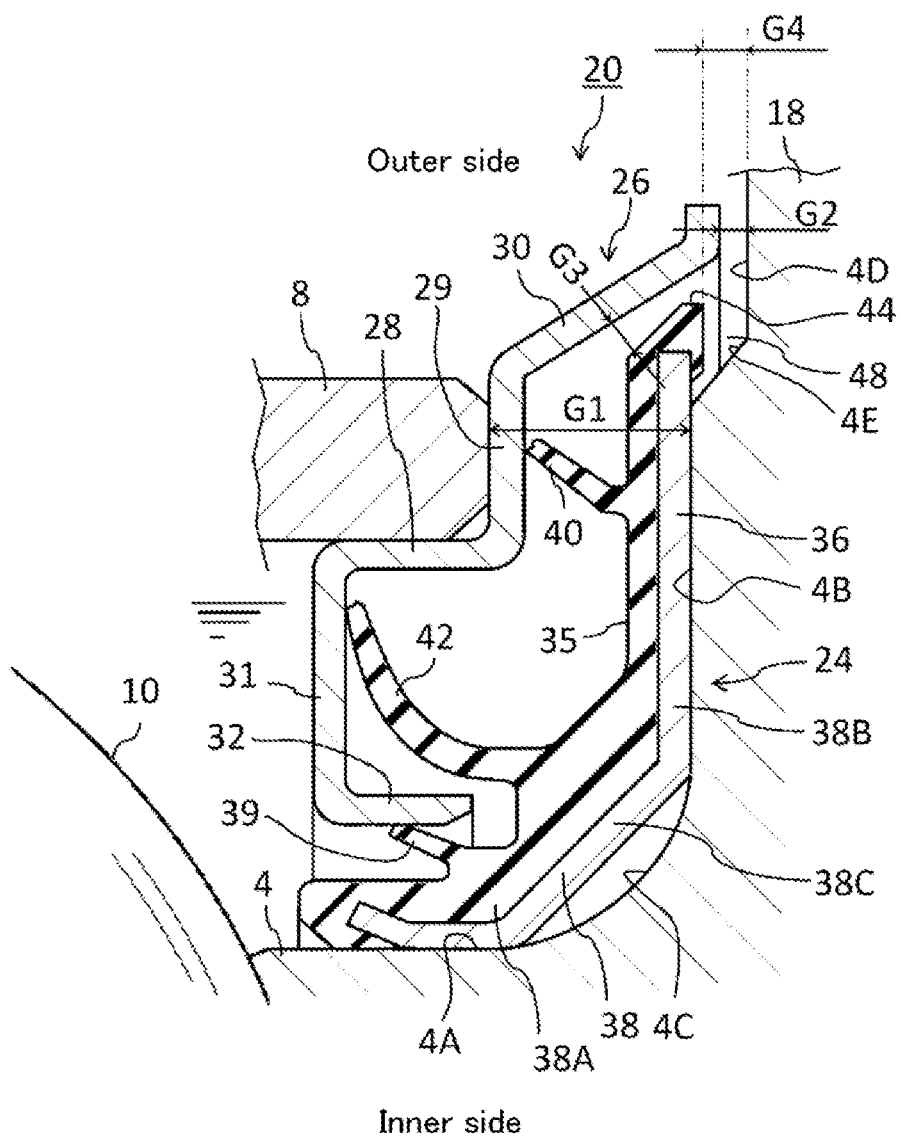

[Figure 3]
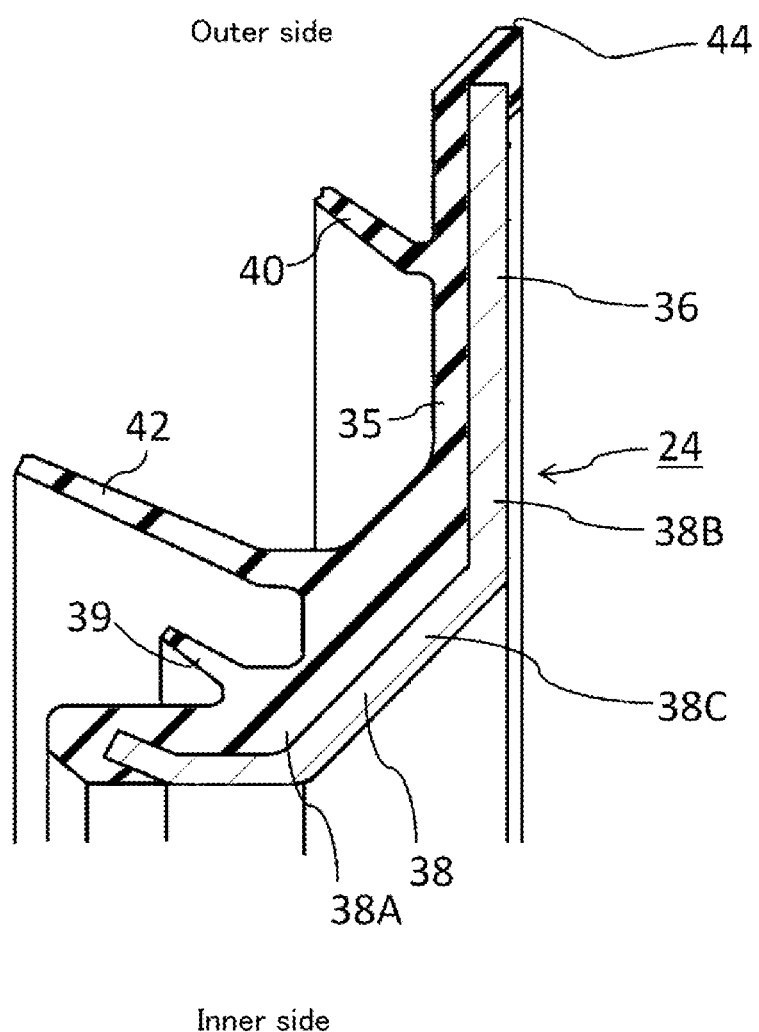

[Figure 4]
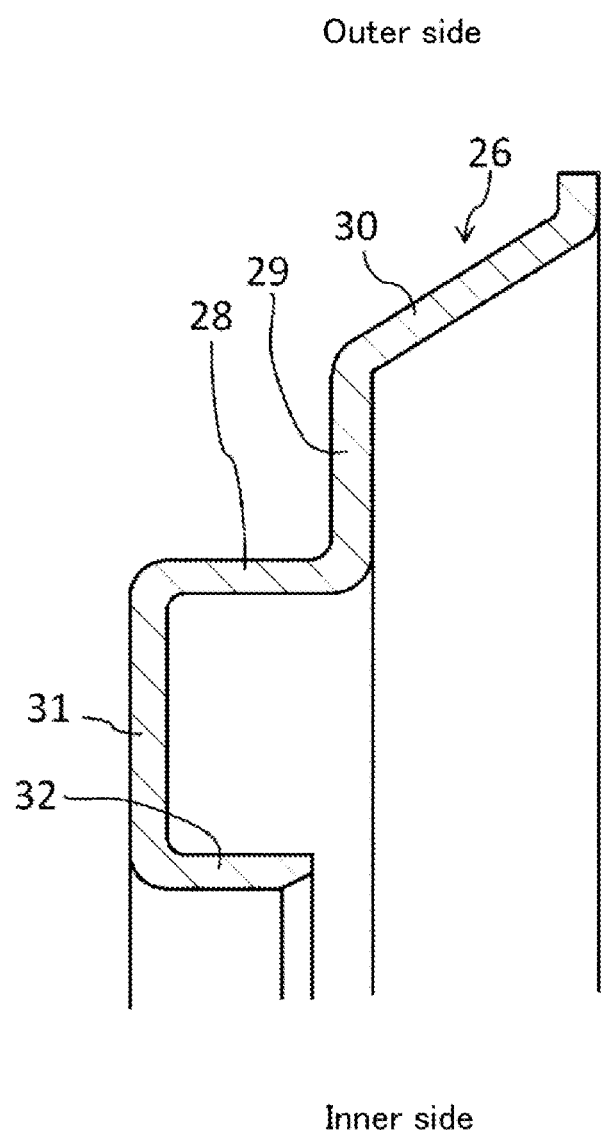

[Figure 5]
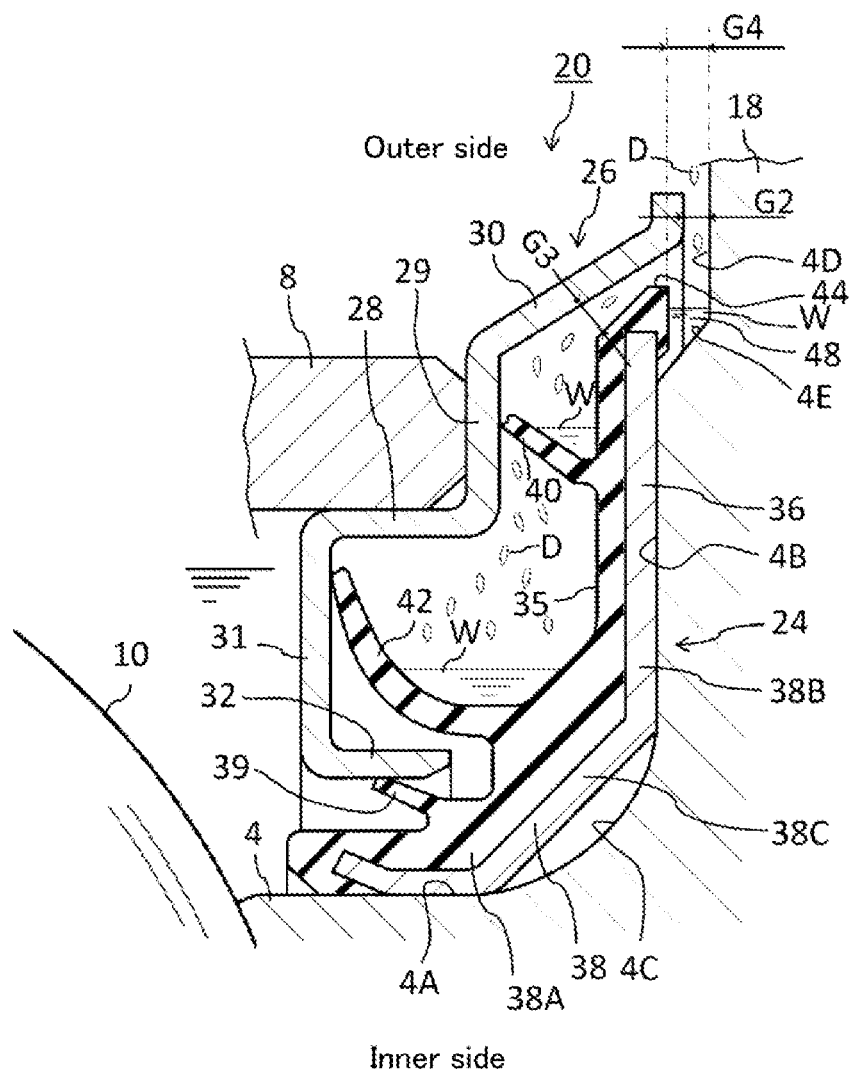

[Figure 6]
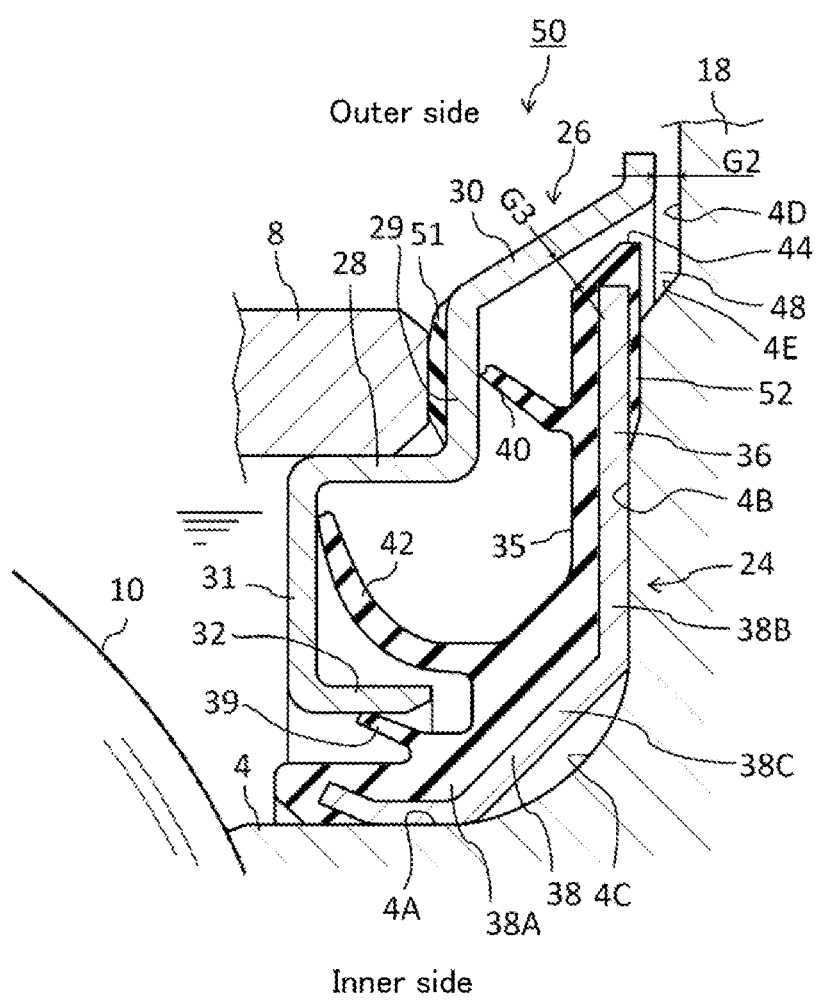

SEALING DEVICE

TECHNICAL FIELD

The present invention pertains to a sealing device for sealing the inside of a rolling bearing.

BACKGROUND ART

Rolling bearings such as ball bearings, for example, are well known and are used in vehicle hubs, for example. Patent document 1 discloses a sealing device for sealing the inside of a rolling bearing. This sealing device comprises: an annular body fixed to an outer race of a rolling bearing; a radial lip that extends radially inward from the annular body; and two side lips that extend laterally from the annular body. The radial lip contacts an outer peripheral surface of the inner race of the bearing or an outer peripheral surface of a part fixed to the inner race and has a function of sealing a lubricant inside the bearing. The two side lips contact the flange, etc. of the inner race and have a function of sealing so that foreign matter such as water, dust, and the like, does not enter the inside of the bearing from the outside.

PRIOR ART DOCUMENTS

Patent Documents

Patent Document 1: Japanese Patent No. 3991200

SUMMARY OF INVENTION

Technical Problem

In this kind of sealing device, a function of isolating the inside of the bearing from the outside is important. Further, when used in an environment having a lot of water (including muddy water or salt water) or dust etc., enhancing a function of protecting the inside of the bearing so that such foreign matter does not enter is demanded.

Here, the objective of the present invention is to provide a sealing device that has a high function of stopping the entry of foreign matter.

Solution to Problem

In order to solve the abovementioned problem, the sealing device according to the present invention is a sealing device which is disposed between a rotating inner member and a fixed outer member of a rolling bearing and which seals a gap between the inner member and the outer member, wherein the sealing device is characterized by comprising an annular rotating seal member fixed to the inner member, and an annular seal cover fixed to an end portion of the outer member, said seal cover comprising a fixed portion fixed to the outer member, and a protective portion that is disposed radially outward of the rotating seal member and stops foreign matter from advancing to the rotating seal member from the outside, said rotating seal member comprising an attachment portion fixed to the inner member, and a seal lip and a dust lip that extend from the attachment portion toward the seal cover, said dust lip extending obliquely radially outward from the attachment portion toward the seal cover.

According to the present invention, the sealing device comprises an annular rotating seal member and an annular seal cover which is combined therewith. The protective portion of the seal cover is disposed radially outward of the rotating seal member and stops foreign matter from advancing to the rotating seal member from the outside. The rotating seal member comprises a seal lip and a dust lip which extend toward the seal cover, said dust lip extending obliquely radially outward toward the seal cover. Accordingly, even if foreign matter enters from the outside by passing through a gap between the seal cover and the rotating seal member, the foreign matter is stopped by the dust lip and, with the rotation of the rotating seal member, is bounced away by the dust lip toward the outside.

In the sealing device in one embodiment of the present invention, the seal cover further comprises a tubular portion which is disposed radially inward of the outer member and is concentric with the outer member and the inner member, the seal lip of the rotating seal member extending obliquely radially outward from the attachment portion toward the tubular portion. In this case, due to the centrifugal force accompanying the rotation of the rotating seal member, the seal lip is strongly pressed by the tubular portion of the seal cover. Accordingly, even if the centrifugal force accompanying the rotation of the inner member acts on the lubricant inside the bearing, leakage of the lubricant is effectively reduced or prevented by the seal lip.

In the sealing device in one embodiment of the present invention, an interval between the protective portion of the seal cover and an outer peripheral portion of the rotating seal member becomes smaller approaching the radially outward direction. In this case, the interval between the protective portion of the seal cover and the outer peripheral portion of the rotating seal member becomes smaller approaching the radially outward direction, and therefore it is difficult for foreign matter to enter from the outside and it is easy to discharge foreign matter from within the sealing device to the outside.

In the sealing device of one embodiment of the present invention, the outer peripheral portion of the rotating seal member is disposed outward of an inclined surface between a first wall surface of the inner member that is nearest to the end portion of the outer member and a second wall surface of the inner member that is radially outward of the first wall surface and that is more depressed than the first wall surface. In this case, even if foreign matter enters a gap between the protective portion of the seal cover and the second wall surface of the inner member, the outer peripheral portion of the rotating seal member is disposed outward of the inclined surface between the first wall surface and the second wall surface, and therefore, it is difficult for foreign matter to pass through the gap between the protective member and the outer peripheral portion of the rotating seal member, and due thereto, it is difficult for foreign matter to enter the inside of the sealing device from the outside.

In the sealing device of one embodiment of the present invention, the seal cover further comprises an outer wall portion which is caused to closely adhere to the end portion of the outer member, and an inner wall portion that is disposed radially inward of the outer wall portion and toward a rolling body of the rolling bearing, the rotating seal member comprising two dust lips, wherein the radially outward disposed dust lip of the dust lips extends from the attachment portion toward the outer wall portion of the seal cover, and the radially inward disposed dust lip of the dust lips extends from the attachment portion toward the inner wall portion of the seal cover. In this case, even if foreign matter passes through a gap between the radially outward disposed dust lip and the outer wall portion of the seal cover, the radially inward disposed dust lip stops the foreign matter. The radially inward disposed dust lip extends as far as the inner wall portion disposed more toward the rolling body of the rolling bearing than the outer wall portion of the seal cover, and therefore, is longer than the radially outward disposed dust lip. Due thereto, the radially inward disposed dust lip has a high function of stopping foreign matter.

Advantageous Effects of Invention

In the present invention, the protective portion of the seal cover is disposed radially outward of the rotating seal member and stops foreign matter from advancing to the rotating seal member from the outside. Further, even if foreign matter enters from the outside by passing through an interval between the protective portion and the rotating seal member, the foreign matter is stopped by the dust lip and, with the rotation of the rotating seal member, is bounced away by the dust lip toward the outside. Accordingly, the sealing device according to the present invention has a high function of stopping the entry of foreign matter. Further, foreign matter is bounced away by the dust lip and therefore there is little risk of foreign matter remaining at the dust lip, and a reduction in undesired alteration of and damage to the dust lip. Moreover, the dust lip extends obliquely radially outward from the attachment portion toward the seal cover and therefore the faster is the rotation of the rotating seal member, the more the dust lip deforms due to centrifugal force and the smaller is the contact force of the dust lip with respect to the seal cover. Accordingly, an increase in torque caused by contact between the dust lip and the seal cover is suppressed.

BRIEF DESCRIPTION OF DRAWINGS

FIG. 1 is a partial cross-sectional view of one example of a rolling bearing in which a sealing device according to an embodiment of the present invention is used.

FIG. 2 is a partial cross-sectional view of a sealing device according to a first embodiment of the present invention.

FIG. 3 is a partial cross-sectional view of the rotating seal member of the sealing device of FIG. 2.

FIG. 4 is a partial cross-sectional view of the seal cover of the sealing device of FIG. 2.

FIG. 5 is a diagram showing a mode of use of the sealing device of FIG. 2.

FIG. 6 is a partial cross-sectional view of a sealing device according to a second embodiment of the present invention.

DESCRIPTION OF EMBODIMENTS

Below, various embodiments of the present invention are described with reference to the attached drawings.

First Embodiment

FIG. 1 shows a vehicle hub bearing which is one example of a rolling bearing in which the sealing device according to an embodiment of the present invention is used. However, use of the present invention is not limited to a hub bearing and the present invention can also be applied to other rolling bearings. Further, in the following description, the hub bearing is a ball bearing, but use of the present invention is not limited to a ball bearing and the present invention can also be applied to other rolling bearings, such as roller bearings, needle bearings, or the like, which have another kind of rolling body.

This hub bearing 1 has: a hub (inner member) 4 having a hole 2 into which a spindle (not shown) is inserted; an inner race (inner member) 6 attached to the hub 4; an outer race (outer member) 8 disposed outward of the hub 4 and the inner race 6; balls 10 disposed in one row between the hub 4 and the outer race 8; balls 12 disposed in one row between the inner race 6 and the outer race 8; and a plurality of retainers 14, 15 which retain these balls in a set position.

Although the outer race 8 is fixed, the hub 4 and the inner race 6 rotate with the rotation of the spindle.

A common axis of the spindle and the hub bearing 1 extends in the horizontal direction in FIG. 1. FIG. 1 shows only an upper portion of the common axis. The right side of FIG. 1 is an outer side (outboard side) in which a wheel (not shown) of a vehicle is disposed, and the left side of FIG. 1 is an inner side (inboard side) in which a differential gear (not shown), etc. is disposed. The outer race 8 of the hub bearing 1 is fixed to a hub knuckle 16. The hub 4 has an outboard side flange 18 for attaching a wheel.

A sealing device 20 for sealing an interval between the outer race 8 and the hub 4 is disposed at an end portion of the outboard side of the outer race 8, and a sealing device 22 for sealing an interval between the outer race 8 and the inner race 6 is disposed at the inner side of the end portion of the outboard side of the outer race 8. Due to the actions of these sealing devices 20, 22, grease, i.e., a lubricant, is prevented from flowing out from the inside of the hub bearing 1 and foreign matter is prevented from flowing to the inside of the hub bearing 1 from the outside.

The sealing device 20 is disposed between the rotating hub 4 and the fixed outer race 8 of the hub bearing 1. Specifically, as shown in FIG. 2, the sealing device 20 is disposed near the end portion of the outboard side of the outer race 8, the balls 10, and the outboard side flange 18 of the hub 4 of the hub bearing 1. The majority of the sealing device 20 is disposed in a space surrounded by: the end portion of the outboard side of the outer race 8; the outer peripheral surface 4A near the balls 10 of the hub 4 of the hub bearing 1; a flange surface 4B of the hub 4 which spreads outwardly wider than the outer peripheral surface 4A and faces an end surface of the outer race 8; and a circular arc surface 4C which couples the outer peripheral surface 4A and the flange surface 4B. The sealing device 20 is annular, but FIG. 2 shows only an upper portion thereof.

As shown in FIG. 2, the sealing device 20 comprises: an annular rotating seal member 24 fixed to the hub 4; and an annular seal cover 26 fixed to the end portion of the outer race 8. FIG. 3 is a partial cross-sectional view of the rotating seal member 24 and FIG. 4 is a partial cross-sectional view of the seal cover 26. The sealing device 20 is an assembly in which the rotating seal member 24 and the seal cover 26 are combined.

The rotating seal member 24 and the seal cover 26 work in coordination with one another to seal a lubricant inside the hub bearing 1. The rotating seal member 24 is fitted in the fixed seal member 26 and when a large force is applied along the axial direction of the sealing device 1, the fit thereof is released and the rotating seal member 24 can be removed.

The seal cover 26 is a rigid body, such as a single steel member, and has a curved cross-sectional shape. The seal cover 26 comprises a fixed portion 28, an outer wall portion 29, and a protective portion 30. The fixed portion 28 is a cylinder that is concentric with the hub 4 and the outer race 8 and is fixed to the outer race 8. The method of fixing is not limited, but may be an interference fit, for example. The outer wall portion 29 spreads radially outward from one end portion of the fixed portion 28 and is caused to adhere closely to the end surface of the outer racer 8.

The protective portion 30 has a substantially truncated cone shape and becomes obliquely wider from an outer end of the outer wall portion 29 toward the radially outward direction so as to cover the majority of an interval between the end surface of the outer race 8 and the outboard side flange 18. The protective portion 30 is disposed radially outward of a gap G1 between the end surface of the outboard side of the outer race 8 and the flange surface 4B of the hub 4. Further, the protective portion 30 is disposed radially outward of the rotating seal member 24 and stops foreign matter from advancing to the rotating seal member 24 (that is, to the inside of the sealing device 20) from the outside. However, a gap G2 is provided between the distal end of the protective portion 30 and the outboard side flange 18, and foreign matter (including water (including muddy water or salt water) and dust, etc.) is permitted to pass through this gap G2.

Moreover, the seal cover 26 comprises an inner wall portion 31 and a tubular portion 32. The inner wall portion 31 becomes wider toward the radially inward direction from an end portion (end portion of the ball 10 side) of the fixed portion 28 on the opposite side to the outer wall portion 29. The tubular portion 32 is a tube that extends from an inner end of the inside wall portion 31 and is concentric with the hub 4 and the outer race 8 (that is, concentric with the fixed portion 28).

Meanwhile, the rotating seal member 24 is a double structure having: an elastic ring 35 formed from an elastic body such as an elastomer; and a reinforcement ring 36 which is a rigid body, such as a metal having a substantially L-shaped cross-section, for reinforcing the elastic ring 35. The reinforcement ring 36 closely adheres to the elastic ring 35 and a portion thereof is embedded in the elastic ring 35.

The rotating seal member 24 comprises: an attachment portion 38 fixed to the hub 4; and a seal lip 39 and dust lips 40, 42 which extend from the attachment portion 38 toward the seal cover 26.

The attachment portion 38 is a circular ring having a substantially L-shaped cross-section and is configured from the elastic ring 35 and the reinforcement ring 36. The attachment portion 38 has: a cylindrical portion 38A which covers the periphery of the outer peripheral surface 4A of the hub 4; a circular plate portion 38B which faces the flange surface 4B of the hub 4; and an inclined portion 38C which faces the circular arc surface 4C of the hub 4. A portion of the cylindrical portion 38A corresponding to the reinforcement ring 36 is caused to closely adhere to the outer peripheral surface 4A of the hub 4. A portion of the circular plate portion 38B corresponding to the reinforcement ring 36 is caused to closely adhere to the flange surface 4B of the hub 4. The inclined portion 38C couples the cylindrical portion 38A and the circular plate portion 38B, and a portion of the inclined portion 38C corresponding to the reinforcement ring 36 is caused to closely adhere to the circular arc surface 4C of the hub 4.

The seal lip 39 and the dust lips 40, 42 are formed from an elastic body only and are thin plate-shaped circular rings extending from the elastic ring 35. The seal lip 39 extends obliquely radially outward from the cylindrical portion 38A of the attachment portion 38 toward the tubular portion 32 of the seal cover 26, and the distal end of the seal lip 39 is caused to contact the tubular portion 32 of the seal cover 26. As is clear from a comparison of FIG. 2 and FIG. 3, when the rotating seal member 24 is fitted in the fixed seal member 26, the seal lip 39 receives a reaction force from the tubular portion 32 and is caused to elastically deform from the original shape of the seal lip 39. The seal lip 39 predominantly fulfills a role of stopping a lubricant from flowing out from the inside of the hub bearing 1.

The radially outward disposed dust lip 40 of the dust lips 40, 42 extends obliquely radially outward from the cylindrical portion 38A of the attachment portion 38 toward the outer wall portion 29 of the seal cover 26. The radially inward disposed dust lip 42 extends obliquely radially outward from the attachment portion 38 toward the inner wall portion 31 of the seal cover 26. The dust lips 40, 42 predominantly fulfill a role of stopping foreign matter from flowing into the inside of the hub bearing 1 from the outside.

As is clear from a comparison of FIG. 2 and FIG. 3, when the rotating seal member 24 is fitted in the fixed seal member 26, the dust lip 42 receives a reaction force from the inner wall portion 31 that the dust lip 42 contacts, and the dust lip 42 is caused to elastically deform significantly from the original shape of the dust lip 42. Accordingly, the foreign matter stopping function of the dust lip 42 is high.

Meanwhile, even if the rotating seal member 24 is fitted in the fixed seal member 26, the dust lip 40 is not caused to elastically deform at all, or almost not at all. That is, the dust lip 40 may be caused to be contacted by a slight interference with the outer wall portion 29 of the seal cover 26, and there may be a slight gap between the dust lip 40 and the outer wall portion 29. In that case, an increase in torque caused by contact between the dust lip 40 and the outer wall portion 29 is prevented or suppressed.

However, the same as the dust lip 42, the dust lip 40 may be formed longer so that when the rotating seal member 24 is fitted in the fixed seal member 26, the dust lip 40 receives a reaction force from the outer wall portion 29 and is caused to elastically deform significantly from the original shape of the dust lip 40. In that case, it is possible to enhance the foreign matter stopping function of the dust lip 40.

In this embodiment, two dust lips 40, 42 are provided, but the number of dust lips may be one or three or more.

As shown in FIG. 2, the hub 4 has an outer peripheral surface 4A, a flange surface 4B, and a circular arc surface 4C. The outer peripheral surface 4A is near the balls 10. The flange surface (first wall surface) 4B becomes wider perpendicular to the axial direction of the hub bearing 1 radially outward of the outer peripheral surface 4A and faces the end surface of the outer race 8. The circular arc surface 4C couples the outer peripheral surface 4A and the flange surface 4B. The flange surface 4B forms a portion of the outboard side flange 18.

Further, the hub 4 has a second flange surface (second wall surface) 4D and an inclined surface 4E. The second flange surface 4D is radially outward of the flange surface 4B and more depressed than the flange surface 4B (that is, compared to the flange surface 4B, the second flange surface 4D is far from the outer race 8 in a direction parallel to the axial direction of the hub bearing 1). The second flange surface 4D forms a portion of the outboard side flange 18. The inclined surface 4E couples the flange surface 4B and the second flange surface 4D.

The outer peripheral portion 44 of the rotating seal member 24 is disposed radially outward of a gap G1 between the end surface of the outboard side of the outer race 8 and the flange surface 4B of the hub 4. The majority of the outer peripheral portion 44 is configured from an elastic body and covers the outer periphery of the reinforcement ring 36. The outer peripheral portion 44 is disposed outward of the inclined surface 4E between the flange surface (first wall surface) 4B of the hub 4 that is nearest the end portion of the outer race 8 and a second flange surface 4D of the hub 4 that is radially outward of the flange surface 4B and that is more depressed than the flange surface 4B. Due to this arrangement, an accumulation space 48 for foreign matter is formed by the outer peripheral portion 44, the inclined surface 4E, and the second flange surface 4D.

A taper is formed in the outer peripheral portion 44. Between this tapered surface and the protective portion 30 of the seal cover 26, a gap G3 through which foreign matter can pass is provided. This gap G3, that is, an interval between the protective portion 30 of the seal cover 26 and the outer peripheral portion 44 of the rotating seal member 24, becomes smaller approaching the radially outward direction.

FIG. 5 shows a mode of use of the sealing device 20 according to this embodiment. In particular, FIG. 5 shows a state in which water W (including muddy water or salt water) has entered the inside of the sealing device 20. As described above, according to this embodiment, the sealing device 20 comprises an annular rotating seal member 24 and an annular seal cover 26 which is combined therewith. The protective portion 30 of the seal cover 26 is disposed radially outward of the rotating seal member 24 and stops foreign matter (including water, dust, and the like) from advancing to the rotating seal member 24 from the outside. The rotating seal member 24 comprises a seal lip 39 and dust lips 40, 42 which extend toward the seal cover 26, wherein the dust lips 40, 42 extend obliquely radially outward toward the seal cover 26. Accordingly, even if foreign matter enters from the outside by passing through an interval (in this embodiment, gaps G2, G3) between the seal cover 26 and the rotating seal member 24, the foreign matter is stopped by the dust lips 40, 42 and, with the rotation of the rotating seal member 24, is bounced away by the dust lips 40, 42 toward the outside. FIG. 5 shows a droplet D which has been bounced away. The foreign matter represented by the droplet D passes through the gaps G2 and G3 again and exits the sealing device 20 to the outside. Accordingly, the sealing device 20 according to this embodiment has a high function of stopping the entry of foreign matter. Further, foreign matter is bounced away by the dust lips 40, 42 and therefore, there is little risk of foreign matter remaining at the dust lips 40, 42, and a reduction in undesired alteration of and damage to the dust lips 40, 42 caused by residual foreign matter.

In this embodiment, the radially outward disposed dust lip 40 extends from the attachment portion 38 of the rotating seal member 24 toward the outer wall portion 29 of the seal cover 26, and the radially inward disposed dust lip 42 extends from the attachment portion 38 toward the inner wall portion 31 of the seal cover 26. Even if foreign matter passes through an interval between the radially outward disposed dust lip 40 and the outer wall portion 29 of the seal cover 26, the radially inward disposed dust lip 42 stops the foreign matter. The radially inward disposed dust lip 42 extends as far as the inner wall portion 31 disposed further toward the balls 10 of the hub bearing 1 than the outer wall portion 29 of the seal cover 26, and therefore, is longer than the radially outward disposed dust lip 42. Due thereto, the radially inward disposed dust lip 42 has a high function of stopping foreign matter.

Moreover, the dust lips 40, 42 extend obliquely radially outward from the attachment portion 38 toward the seal cover 26, and therefore the faster is the rotation of the rotating seal member 24, the more the dust lips 40, 42 deform due to centrifugal force and the smaller is the contact force of the dust lips 40, 42 with respect to the seal cover 26. Accordingly, an increase in torque caused by contact between the dust lips 40, 42 and the seal cover 26 is suppressed. Further, in this embodiment, the radially outward disposed dust lip 40 of the dust lips 40, 42 may be caused to be contacted by a slight interference with the outer wall portion 29 of the seal cover 26, and there may be a slight gap between the dust lip 40 and the outer wall portion 29. It is anticipated that the foreign matter which is bounced away by the dust lip 42 is discharged radially outwardly through the gap between the dust lip 40 and the outer wall portion 29.

Although not essential, the outer peripheral portion 44 of the rotating seal member 24 is disposed outward of the inclined surface 4E between the flange surface 4B of the hub 4 that is nearest the end portion of the outer race 8; and a second flange surface 4D of the hub 4 that is radially outward of the flange surface 4B and that is more depressed than the flange surface 4B. Accordingly, even if foreign matter enters through the gap G2 between the protective portion 30 of the seal cover 26 and the second flange surface 4D of the hub 4, the outer peripheral portion 44 of the rotating seal member 24 is disposed outward of the inclined surface 4E between the flange surface 4B and the second flange surface 4D, and therefore it is difficult for foreign matter to pass through the gap G3 between the protective member 30 and the outer peripheral portion 44 of the rotating seal member 24, and due thereto, it is difficult for foreign matter to enter the inside of the sealing device 20 from the outside. FIG. 5 shows a state in which water W has accumulated in the accumulation space 48 formed by the outer peripheral portion 44, the inclined surface 4E, and the second flange surface 4D. It is anticipated that the foreign matter (for example, water W) in the accumulation space 48 is discharged by being conveyed, for example, through the accumulation space 48 in the circumferential direction by gravity.

Although not essential, the interval between the protective portion 30 of the seal cover 26 and the outer peripheral portion 44 of the rotating seal member 24, i.e., gap G3, becomes smaller approaching the radially outward direction. Accordingly, it is difficult for foreign matter to enter from the outside through the gap G3 and it is easy to discharge foreign matter from the sealing device 20 to the outside through the gap G3.

Although not essential, the interval G4 between the outer peripheral portion 44 of the rotating seal member 24 and the second flange surface 4D of the hub 4 is larger than the gap G2 between the protective portion 30 of the seal cover 26 and the second flange surface 4D of the hub 4. Accordingly, when foreign matter enters from the outside through the gap G2, the foreign matter accumulates in the accumulation space 48, is discharged by being conveyed, for example, through the accumulation space 48 in the circumferential direction by gravity and does not easily enter the gap G3.

Although not essential, the seal lip 39 of the rotating seal member 24 extends obliquely radially outward from the attachment portion 38 toward the tubular portion 32 of the seal cover 26. Due thereto, the seal lip 39 is strongly pressed by the tubular portion 32 of the seal cover 26 due to the centrifugal force accompanying the rotation of the rotating seal member 24. Accordingly, even if the centrifugal force accompanying the rotation of the hub 4 acts on a lubricant inside the hub bearing 1, leakage of the lubricant is effectively reduced or prevented by the seal lip 39.

Second Embodiment

FIG. 6 shows a sealing device 50 according to a second embodiment of the present invention. FIG. 6 shows constituent elements which are in common with the first embodiment and therefore the same reference signs are used and no detailed description is provided regarding these constituent elements.

An elastic ring 51 formed from an elastic body such as an elastomer is attached to the outer wall portion 29 of the seal cover 26 of this sealing device 50. When using the sealing device 50, the elastic ring 51 is disposed between an end surface of the outboard side of the outer race 8 and the outer wall portion 29 and prevents or suppresses foreign matter from entering a gap therebetween. Instead of the elastic ring 51 which is fastened to the seal cover 26, an elastic body part different to the seal cover 26, for example an O-ring, may be disposed between the end surface of the outboard side of the outer race 8 and the outer wall portion 29.

Further, an elastic ring 52 formed from an elastic body such as an elastomer is attached to a portion of the reinforcement ring 36 of the circular plate portion 38B of the rotating seal member 24 of the sealing device 50. When using the sealing device 50, the elastic ring 52 is disposed between the portion of the reinforcement ring 36 of the circular plate portion 38B of the sealing device 50 and the outboard side flange 18, and prevents or suppresses foreign matter from entering a gap therebetween. In this sealing device, the elastic ring 52 is continuous with the outer peripheral portion 44 of the rotating seal member 24, but the elastic ring 52 may also be separate from the outer peripheral portion 44. Further, instead of the elastic ring 52 which is a part of the rotating seal member 24, an elastic body part different to the rotating seal member 24, for example an O-ring, may be disposed between a portion of the reinforcement ring 36 of the circular plate portion 38B and the outboard side flange 18.

As described above, various embodiments of the present invention have been described, but the above descriptions do not limit the present invention and, in the technical scope of the present invention, various modified examples can be considered, including deletion, addition, and exchange of constituent elements.

REFERENCE SIGNS LIST

1 Hub bearing
2 Hole
4 Hub (inner member)
4A Outer peripheral surface
4B Flange surface (first wall surface)
4C Circular arc surface
4D Second flange surface (second wall surface)
4E Inclined surface
6 Inner race (inner member)
8 Outer race (outer member)
10, 12 Ball
14, 15 Retainer
16 Hub knuckle
18 Outboard side flange
20, 22, 50 Sealing device
24 Rotating seal member
26 Seal cover
28 Fixed portion
29 Outer wall portion
30 Protective portion
31 Inner wall portion
32 Tubular portion
35 Elastic ring
36 Reinforcement ring
38 Attachment portion
38A Cylindrical portion
38B Circular plate portion
38C Inclined portion
39 Seal lip
40, 42 Dust lip
44 Outer peripheral portion
48 Accumulation space
51, 52 Elastic ring
G1, G2, G3 Gap
W Water
D Droplet

The invention claimed is:

1. A sealing device which is disposed between a rotating inner member and a fixed outer member of a rolling bearing and which seals a gap between the inner member and the outer member, wherein said sealing device comprises:
an annular rotating seal member fixed to the inner member; and
an annular seal cover fixed to an end portion of the outer member,
said seal cover comprising:
a fixed portion fixed to the outer member, and
a protective portion that is disposed radially outward of at least part of the rotating seal member and the entire fixed portion, comprises a portion that has a truncated cone shape expanding radially outward and axially away from the outer member, and stops foreign matter from advancing to the rotating seal member from an outside, said rotating seal member comprising:
an attachment portion fixed to the inner member; and
a seal lip and a dust lip that extend from the attachment portion toward the seal cover,
said dust lip extending obliquely radially outward from the attachment portion toward the seal cover.

2. The sealing device according to claim 1, wherein:
the seal cover further comprises a tubular portion which is disposed radially inward of the outer member and is concentric with the outer member and the inner member; and
the seal lip of the rotating seal member extends obliquely radially outward from the attachment portion toward the tubular portion.

3. The sealing device according to claim 1, wherein an interval between the protective portion of the seal cover and an outer peripheral portion of the rotating seal member becomes smaller approaching a radially outward direction.

4. The sealing device according to claim 1, wherein an outer peripheral portion of the rotating seal member is disposed outward of an inclined surface between a first wall surface of the inner member that is nearest to the end portion of the outer member and a second wall surface of the inner member that is radially outward of the first wall surface and that is more depressed than the first wall surface.

5. The sealing device according to claim 1, wherein the seal cover further comprises:
an outer wall portion that is caused to closely adhere to the end portion of the outer member; and
an inner wall portion that is disposed radially inward and more toward a rolling body of the rolling bearing than the outer wall portion,
said rotating seal member being provided with two dust lips, wherein:
a radially outward disposed dust lip of the dust lips extends from the attachment portion toward the outer wall portion of the seal cover; and a radially inward disposed dust lip of the dust lips extends from the attachment portion toward the inner wall portion of the seal cover.

* * * * *